United States Patent [19]

Mena

[11] Patent Number: 5,234,293
[45] Date of Patent: Aug. 10, 1993

[54] SCREW TAP WITH PREDETERMINED PROTECTIVE RUPTURE OF RELEASE POINT

[76] Inventor: Carl M. Mena, 58357 C.R. 111, Elkhart, Ind. 46517

[21] Appl. No.: 901,247

[22] Filed: Jun. 19, 1992

[51] Int. Cl.⁵ ............................................. B23G 5/06
[52] U.S. Cl. .................................... 408/57; 408/222; 408/226
[58] Field of Search .................. 408/222, 226, 57, 59; 470/198

[56] References Cited

U.S. PATENT DOCUMENTS

| | | | |
|---|---|---|---|
| 1,398,156 | 11/1921 | Schroder | 408/222 |
| 2,101,347 | 12/1937 | Robinette | 408/222 |
| 2,740,974 | 4/1956 | Lewis | 408/222 |
| 3,458,882 | 8/1969 | Kelly | 470/198 |

FOREIGN PATENT DOCUMENTS 0203260 10/1983 German Democratic Rep. ................................. 408/226

Primary Examiner—Steven C. Bishop
Attorney, Agent, or Firm—James D. Hall

[57] ABSTRACT

A tap for forming internal threads on the inner wall of a bore wherein the shank portion has a rupture location at the time of over torquing. The rupture location may be created by the junction of two shank parts having different sized cross sections, an internal cavity within the axial bore of the shank, opposing holes perpendicular to the longitudinal axis of the shank, the junction of two coaxial bores in the shank having different sized diameters, junction of two shank parts with one such part being of softer material than the other, or opposing notches formed on the exterior of the shank.

10 Claims, 1 Drawing Sheet

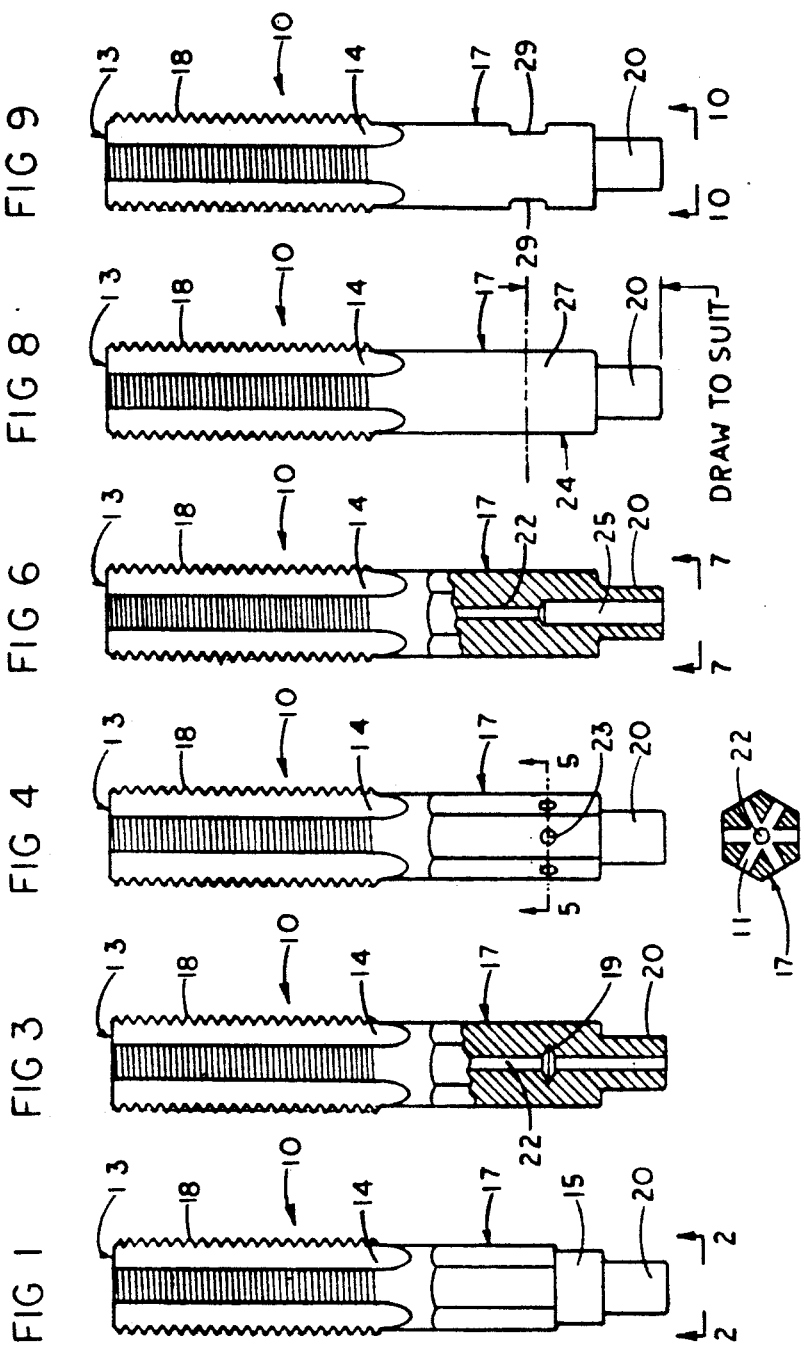
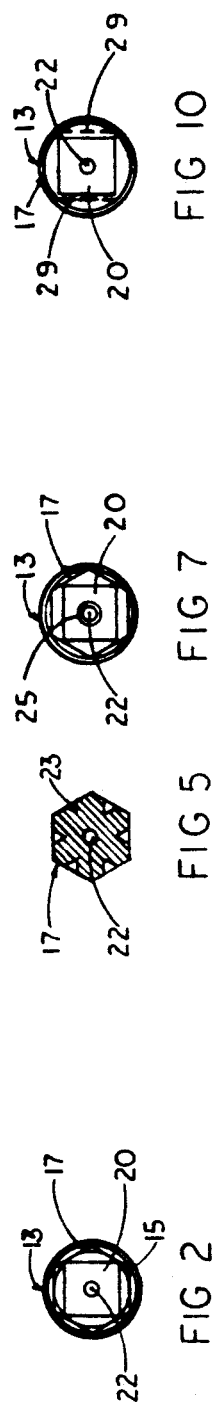

SCREW TAP WITH PREDETERMINED PROTECTIVE RUPTURE OF RELEASE POINT

SUMMARY OF THE INVENTION

This invention relates to an improved tap structure in which various physical embodiments of the shank design create a potential rupture or release location on the tap shank which, at the time of over-torquing will allow the tap to break at this location. Thus the tap will usually rupture at this predetermined location on the shank section, rather than in the flute area within the work piece bore. In this manner a mating socket or wrench can be used to engage the remaining exposed broken tap segment that incorporates the flutes to allow the simple extraction of the broken tap from the work piece.

Controlling this potential predetermined rupture or break location along the centerline axis of the tap shank may be accomplished in several similar ways. It is the intent of this invention to cover the various configurations and combinations thereof that may accomplish this requisite as follows:

1. Any shank configuration, i.e., round, hexagon, square, octagon or a combination thereof, having an exterior step, thusly creating a controlled differential release area.

2. The controlled release location may also be accomplished by "trepaning" or internally grooving the coaxial coolant bore in the tap.

3. A controlled release or break location may also be obtained with one or more empirically sized traverse holes formed in or through the shank axis.

4. A release location may be created with one or more enlargements of the coaxial coolant bore.

5. Furthermore the protective controlled release or rupture location in the shank may be accomplished by drawing the shank to one or more empirically suitable R.C. hardnesses.

6. Also one or more flats or square, hexagon or octagon reductions can be formed in the shank for creating a release or rupture location.

BRIEF DESCRIPTION OF THE DRAWINGS

FIG. 1 is a side view of a tap of this invention with an external step formed in the shank to create a controlled differential for a rupture or release location.

FIG. 2 is an end view of the tap as seen along line 2—2 of FIG. 1.

FIG. 3 is a side view of another tap with its shank partially sectioned to illustrate the trepaning of the thru bore.

FIG. 4 is a side view of another tap showing transverse countersink holes formed in shank.

FIG. 5 is a sectional view taken along line 5—5 of FIG. 4.

FIG. 6 is a side view of another tap with the shank being partially sectioned to illustrate enlarged release hole formed in the coolant bore.

FIG. 7 is an end view of the tap as seen along line 7—7 of FIG. 6.

FIG. 8 is a side view of another tap that has been singularly or progressively drawn to a predetermined lower Rockwell "C" hardness than that required for the flutes for the purpose of establishing the required break or release location.

FIG. 9 is a side view of another tap showing opposing notches or flats formed in the shank of the tap for creating a release section.

FIG. 10 is an end view as seen along line 10—10 of FIG. 9.

FIG. 11 is an optional sectional end view along line 5—5 showing one or more thru holes perpendicular to the tap axis.

DESCRIPTION OF THE PREFERRED EMBODIMENTS

The preferred embodiments are illustrated to show various combinations and configurations that may accomplish a predetermined protective rupture or release location at the time of over torquing stress and are not intended to limit the invention to the precise form or forms disclosed. They are chosen and described in order to best explain the principles of the invention, its application and practical use to thereby enable others skilled in the art to best utilize the invention.

While, for purposes of illustration, serial or bottoming taps are depicted, it is to be understood that the above described and following concept may be incorporated into any other style or type of tap.

Tap 10, as shown in FIGS. 1 thru 11, includes a shank end 17 and a threaded end 13. Threaded end 13 has a plurality of flutes 14 which form a space for chips to collect during the tapping process. External threads 18 are formed in the outer edge of threaded end 13 to contact and cut threads in the bore side walls of the work piece (not shown). In the figures, shank 17 has a common squared end 20, which is adapted for manual turning with a standard tap wrench or an ordinary wrench, but which may be adapted for connection to any number or different means or devices for rotating tap 10 into the work piece bore.

A bore 22 may be formed along the central axis of the tap to provide vaporized lubrication, liquid cooling, or an air blast for chip removal. Furthermore, bore 22 can be integrated to strengthen the tap by distributing cutting and torquing stress evenly around the tap periphery.

The purpose of this invention is to provide torque caused fracture release in a pre-determined shank location to allow a sufficient portion of shank 17 to remain for extracting the remaining broken tap segment with a standard socket wrench, tap wrench or an equivalent applicable wrench. This can be accomplished as herein described by several embodiments:

The rupture site of the embodiment of tap 10 as seen in FIG. 1 and FIG. 2 is accomplished by having a cross section reduction of any two configurations, i.e., round, hexagon, square, octagon or a combination thereof, thusly creating a controlled differential release location. This is illustrated as reduced part 15 of shank 17.

The rupture site of the embodiment as seen in FIG. 3 is accomplished by trepaning or scoring a circular portion of axial bore 22 to form an annular cavity to provide for a pre-located rupture at the time of over torquing tap 10.

The rupture site of the embodiment of tap 10 as seen in FIG. 4 and FIG. 5 is formed by radial countersink release holes 23 for a prelocated rupture at the time of over-torquing. FIG. 11 shows one or more thru holes perpendicular to the tap to provide for a prelocated rupture at the time of over-torquing tap 10. (Though not shown, these thru holes 11 may be partially plugged with soft stock to prevent lubrication loss.)

The rupture site of the embodiment of tap 10 as seen in FIG. 6 and FIG. 7 may be accomplished by counterboring bore 22 to form an enlarged coaxial bore 25 to provide for the necessary torque release location at the counter-bore.

The rupture site of the embodiment of tap 10 as seen in FIG. 8 may be obtained by drawing a short portion 24 of shank 17 to a predetermined lesser Rockwell "C" hardness to provide for the release rupture at shank segment 27 when over torquing.

The rupture site of the embodiment of tap 10 as seen in FIG. 9 and FIG. 10 is obtained by one or more multiple flats or notches 29 located on the short portion of shank end 17. The flats may also be square, hexagonal, or octagonal in cross-section to provide for rupture release under over torquing.

It is understood that the above description does not limit the invention to the given details, but may be modified within the scope of the following claims.

What I claim is:

1. A tap comprising:
a threaded portion and a shank portion, said shank portion having an axial bore, said bore having an enlarged internal cavity, the junction between said cavity and said bore constituting means for creating a place of shank rupture at the time of over-torquing of said tap.

2. A tap comprising:
a threaded portion and a shank portion, said shank portion having a number of radial countersink holes in its outer surface, creating a place of shank rupture at the time of over-torquing of said tap.

3. The tap of claim 2 wherein said shank portion has a plurality of additional cavities, all said cavities radially disposed about the axis of the shank portion, said cavities in said shank portion constituting means for creating a place of shank rupture at the time of over-torquing of said tap.

4. The tap of claim 3 wherein at least one of said cavities extends transversely through said shank portion.

5. A tap comprising:
a threaded portion and a shank portion extending from said threaded portion and terminating in an end, said shank portion having a first bore extending through said shank portion and a larger counter-bore terminating at said end of the shank portion, said counter-bore being coaxial with said first bore, the junction between said first bore and said counter-bore constituting means for creating a place of rupture when over-torqued.

6. A tap comprising:
a threaded flute portion and a shank portion, said shank portion having a driving end part and first and second co-axial parts located between said end part and flute portion, said first part being of larger cross section than said second part of said shank portion, said second part being of larger cross section than said driving end part, the junction between said first part and said second part constituting means for creating a place of shank rupture at the time of over-torquing of said tap.

7. The tap of claim 6 wherein the cross section of said first part of said shank portion is hexagonally shaped.

8. A tap comprising:
a threaded portion and a shank portion, said shank portion having an end part and first and second parts located between said end part and flute portion, said end part being of lesser cross section than said first and second parts of said shank portion, said second part having a lesser predetermined Rockwell "C" hardness than said first part of said shank portion, the junction between said first part and said second part constituting means for creating a place of shank rupture at the time of over-torquing of said tap.

9. A tap comprising:
a threaded portion and a shank portion, said shank portion having a pair of opposing spaced flats, said flats constituting means for creating a place of shank rupture at the time of over-torquing of said tap.

10. A tap comprising a threaded flute portion and a shank portion, said shank portion having at least one hole extending partially through said shank, said hole constituting means for creating a place of shank rupture at the time of over-torquing of said tap.

* * * * *